United States Patent
DiGiovanni et al.

(10) Patent No.: US 6,434,172 B1
(45) Date of Patent: Aug. 13, 2002

(54) ARTICLE COMPRISING A FIBER RAMAN DEVICE

(75) Inventors: David John DiGiovanni, Montclair, NJ (US); Daryl Inniss, Alpharetta, GA (US); Ralph Stephen Jameson, Allentown, PA (US); Sandra Greenberg Kosinski, Murray Hill, NJ (US)

(73) Assignee: Fitel USA Corp.

( * ) Notice: Subject to any disclaimer, the term of this patent is extended or adjusted under 35 U.S.C. 154(b) by 0 days.

(21) Appl. No.: 09/369,393

(22) Filed: Aug. 6, 1999

(51) Int. Cl.$^7$ ................................................ H01S 3/30
(52) U.S. Cl. ................................ 372/6; 372/3; 372/92; 372/102; 385/37
(58) Field of Search ........................... 372/6, 3, 99, 102; 350/96.15; 385/37

(56) References Cited

U.S. PATENT DOCUMENTS

| | | | |
|---|---|---|---|
| 4,741,587 A | * 5/1988 | Jewell et al. ............. 350/96.15 |
| 5,323,404 A | * 6/1994 | Grubb ............................ 372/6 |
| 5,623,508 A |   4/1997 | Grubb et al. .................. 372/3 |
| 5,673,280 A |   9/1997 | Grubb et al. .................. 372/3 |
| 5,815,518 A | * 9/1998 | Reed et al. ..................... 372/6 |
| 5,966,480 A | * 10/1999 | LeGrange et al. ............. 385/37 |
| 6,163,552 A | * 12/2000 | Engelberth et al. .......... 372/102 |
| 6,212,310 B1 | * 4/2001 | Waarts et al. .................. 385/37 |
| 6,275,632 B1 | * 8/2001 | Waarts et al. .................. 385/37 |
| 6,298,187 B1 | * 10/2001 | Waarts et al. .................. 385/37 |
| 6,310,899 B1 | * 10/2001 | Jacobovitz-Veselka et al. ............................ 372/6 |
| 2001/0010696 A1 | * 8/2001 | Bufetov et al. ................ 372/3 |

OTHER PUBLICATIONS

Chernikov et al, *Electronics Letters*, vol. 34, No. 7, pp. 680–681, Apr. 2, 1998.
Chernikov et al., *Electronics Letters*, "High–gain, monolithic, cascaded fibre Raman amplifier operating at 1.3um", vol. 31, No. 6, pp. 472–473, Mar. 16, 1995.

* cited by examiner

*Primary Examiner*—Leon Scott, Jr.
(74) *Attorney, Agent, or Firm*—E. Pacher

(57) ABSTRACT

The disclosed fiber Raman device comprises means for coupling pump radiation of a first wavelength $\lambda_1$ and a second wavelength $\lambda_2$ into a length of silica-based fiber, with $\lambda_1$ being different from $\lambda_2$, and with both of $\lambda_1$ and $\lambda_2$ being less than an output radiation $\lambda_0$ of the fiber Raman device. The Raman device further comprises at least a first and a second wavelength-selective element disposed to provide one or more optical cavities for Raman shifting of light in the fiber. At least one of the optical cavities is selected such that at least one of $\lambda_1$ and $\lambda_2$ is off resonance. Exemplarily, the Raman device is a topologically linear or circular Raman laser or amplifier, and the wavelength selective element is a fiber Bragg grating or a WDM. The Raman device is advantageously used in an optical fiber communication system.

9 Claims, 3 Drawing Sheets

ARTICLE COMPRISING A FIBER RAMAN DEVICE

FIELD OF THE INVENTION

This invention pertains to articles (e.g., an optical fiber communication system, or a light source or amplifier for such a system) that comprise an optical fiber Raman device.

BACKGROUND

Optical fiber Raman lasers and amplifiers (collectively "fiber Raman devices") are known. See, for instance, U.S. Pat. No. 5,323,404 for exemplary embodiments of fiber Raman devices of a first (topologically linear) type, with fiber gratings acting as wavelength-selective elements.

For a second type of fiber Raman laser (topologically circular), see for instance, S. V. Chernikov et al., *Electronics Letters*, Vol. 34(7), April 1998, pp. 680–681. This embodiment uses fused fiber couplers as wavelength-selective element to form a ring cavity. All cited references are incorporated herein by reference.

An optical fiber Raman device can be used to provide pump light (exemplarily of wavelength 1480 nm) to an Er-doped fiber amplifier (EDFA), or can be used to amplify signal light (e.g., at 1310 nm).

FIG. 1 schematically depicts a prior art fiber Raman laser 10 of the topologically linear type, suitable for pumping of an EDFA. Cladding pumped fiber laser (CPFL) 11 provides pump light of a predetermined wavelength (e.g., 1117 nm) to the Raman laser. Raman fiber 12 typically is a silica-based fiber with Ge-doped core, and typically is hundreds of meters long. Numerals 13 and 14 refer to the upstream and downstream grating sets, respectively. It will be appreciated that in a schematically depicted grating set herein each cross-line indicates a separate grating. The upstream set 13 typically comprises only high reflectivity (HR) gratings (exemplarily of center wavelengths 1175, 1240, 1315, 1395, and 1480 nm), and the downstream set 14 typically comprises, in addition to the HR gratings, also a grating of relatively low reflectivity, to provide output coupling. By way of example, the downstream gratings have center wavelengths 1117, 1175, 1240, 1315, 1395 and 1480 nm, with the 1117 nm grating serving as pump reflector. The output coupler has center wavelength corresponding to the desired output wavelength, exemplarily 1480 nm.

CPFLs are known, and are commercially available. See for instance, U.S. patent applications Ser. Nos. 08/897,195 and 08/999,429, respectively filed Jul. 21, 1997 and Dec. 29, 1997 by DiGiovanni et al. Briefly, a CPFL comprises several high power light emitting diodes (exemplarily InGaAlAs diodes). The output of each LED is coupled into a multimode fiber, e.g., a silica-based fiber with 0.22 N.A., 105 $\mu$am core and 125 $\mu$m outside diameter. The fibers are arranged into a bundle, fused together and tapered, as described, for instance, in US patent application Ser. No. 09/315,631, filed May 20, 1999 by D. J. DiGiovanni et al.

To date it has not been convenient to form tapered bundles of more than seven multimode fibers. This has limited the number of pump sources to seven, and has correspondingly limited the power that can conveniently be provided to utilization means, e.g., the EDFA.

It clearly would be desirable to be able to conveniently provide to the fiber Raman device pump light from more than seven LEDs. This application discloses an article that comprises a fiber Raman device that is pumped with light from more than seven pump LEDs, exemplarily 14 pump LEDs.

DEFINITIONS AND GLOSSARY OF TERMS

The terms "light" and "radiation" are used herein interchangeably for electromagnetic radiation of interest herein, typically infrared radiation.

Optical fiber gratings and fused fiber couplers are herein collectively referred to as "wavelength-selective elements". A fused fiber coupler is frequently referred to as a "WDM".

The "Raman spectrum" of an optical fiber is the scattered intensity as a function of wavelength difference from an incident radiation. A shift to longer wavelength is generally referred to as a Stokes shift. Conventionally, the Stokes shift is expressed in inverse centimeters ($cm^{-1}$), but it can also be expressed in terms of wavelengths.

The Raman spectrum of germano-silicate glass is relatively broad, with a pronounced maximum at a Stokes shift of about 440 $cm^{-1}$, relative to the wavelength of the pump light. See FIG. 2 herein, which shows the Raman spectrum for pump light of 1427 nm.

A wavelength-selective element in a Raman device that is responsive to a given pump light is herein referred to as being "on resonance" (with respect to the pump light), and an element that is not responsive to the given pump light is herein referred to as being "off resonance" (with respect to the pump light).

A wavelength-selective element is "responsive" to a given pump light if the elementlight interaction is at or near maximum, for instance, if the pump light is within the wavelength range wherein the reflectivity of the grating is 50% or more of the maximum reflectivity of the grating, or wherein the coupling strength of a fiber coupler (WDM) is 50% or more of the maximum coupling strength of the coupler.

SUMMARY OF THE INVENTION

In a broad aspect, the invention is embodied in an optical fiber communication system or other article that comprises an optical fiber Raman device that is adapted for utilizing high pump power.

The Raman device comprises a length of silica-based optical fiber comprising at least a first and a second wavelength-selective element disposed to provide one or more optical cavities for Raman-shifting of light in said optical fiber, and further comprises a first coupler for coupling pump radiation of a first wavelength $\lambda_1$ from a first pump radiation source into said optical fiber, and still further comprises means for providing a Raman-shifted Raman device output radiation of wavelength $\lambda_0$ greater than $\lambda_1$ to output radiation utilization means. Significantly, the fiber Raman device further comprises a second coupler for coupling pump radiation of a second wavelength $\lambda_2$ from a second pump radiation source into said optical fiber, where $\lambda_2$ is different from $\lambda_1$, with $\lambda_0 > \lambda_2$, wherein at least one of said wavelength-selective elements is off resonance with regard to at least one of $\lambda_1$, and $\lambda_2$.

If the fiber Raman device is a topologically linear Raman laser then the first and second wavelength selective elements typically are fiber gratings, and the means for providing the output radiation to utilization means exemplarily comprise an output coupler of relatively low reflectivity. If the device is a topologically circular Raman laser then the wavelength selective elements typically are fiber couplers (WDMs), and the means for providing the output radiation typically also comprise a WDM.

If the fiber Raman device is a topologically linear Raman amplifier then the wavelength selective elements typically are fiber gratings, and the means for providing the output radiation to utilization means comprise a high-reflectivity optical cavity for radiation that is one Stokes shift from a signal radiation. If the device is a topologically circular Raman amplifier then the wavelength selective elements typically are WDMs, and the means for providing the output radiation typically also comprise a WDM.

If the Raman device is a topologically linear Raman device then $|\lambda_1-\lambda_2|$ typically is greater than 0.2 nm, and if the Raman device is a topologically circular Raman device then $|\lambda_1-\lambda_2|$ typically is greater than about 3 nm.

The figures are not to scale or in proportion.

DETAILED DESCRIPTION

The discussion below will in large part be in terms of two exemplary embodiments, one a (topologically linear) silica-based Raman laser with 1117 nm (on-resonance) first pump light and about 1115 nm (off-resonance) second pump light, with 1480 nm Raman laser output, and the other a (topologically circular) Raman laser with fused fiber couplers as wavelength-selective elements, with 1060 nm (on-resonance) first pump light and 1110 nm (off-resonance) second pump light. However, it will be understood that the invention is not limited to any particular set of pump wavelengths and/or sets of fiber gratings or other wavelength-selective elements, and all fiber Raman devices with suitable pump wavelengths (at least one off resonance) and wavelength-selective elements are contemplated.

Figure 2:
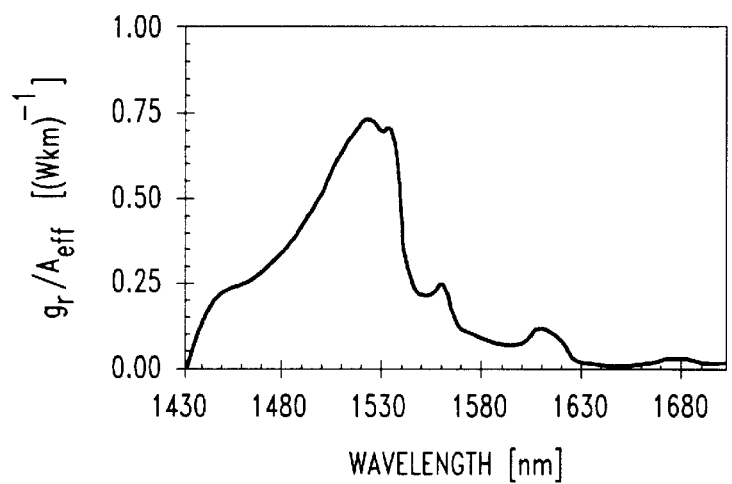
FIG. 2 shows the Raman spectrum of germano-silicate.

FIG. 2 shows the Raman spectrum of a conventional silica-based fiber with germanosilicate core, pumped with 1427 nm pump light. As can be seen from FIG. 2, the maximum scattered intensity occurs at about 1521 nm, but significant intensity extends over the approximate range 1460–1550 nm. In view of the relatively broad Raman spectrum, the wavelength-selective elements in a fiber Raman laser need not be selected to yield the exact maximum Raman scattering but can depart somewhat from that value, with relatively insignificant decrease in scattering intensity. It will be understood that the spectrum of FIG. 2 is specific to the pump wavelength used.

Figure 1:
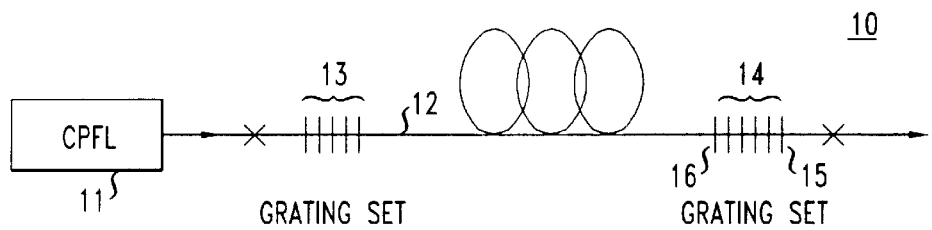
FIG. 1 schematically depicts a prior art topologically linear Raman laser.

In (topologically linear) prior art fiber Raman lasers it is conventional to provide a pump reflector fiber grating that has substantially 100% reflectivity at the wavelength of the pump source 11. In addition to the pump reflector fiber grating, prior art fiber Raman lasers also comprise wavelength-selective elements that form one or more optical cavities. Each cavity comprises two spaced apart fiber gratings that have high reflectivity at essentially the same wavelength. This is schematically depicted in FIG. 1 for an exemplary prior art Raman laser having 1117 nm pump radiation and 1480 nm output radiation. Each cross line of sets 13 and 14 indicates a fiber (Bragg) grating. Exemplarily, the gratings of grating set 13 have minimum transmission at 1480, 1395, 1315, 1240 and 1175 nm, respectively. Similarly, the gratings of set 14 have minimum transmission of 1117, 1175, 1240, 1315, 1385 and 1480, respectively, with the 1480 nm grating serving as output coupler.

For purposes of this invention, the order in which the gratings are arranged is generally not critical. Pump radiation of wavelength 1117 nm is coupled into the Raman fiber and travels in the downstream direction to the 1117 nm pump reflector grating, where essentially all of the remaining 1117 nm radiation is reflected. The 1117 nm radiation undergoes Raman scattering, which results in a build-up of 1175 nm radiation in the 1175 nm optical cavity. In turn, Raman scattering of the 1175 nm radiation results in build-up of 1240 nm radiation in the 1240 nm optical cavity, and so on, until 1480 nm radiation is coupled out of the Raman laser.

All the fiber Bragg gratings of FIG. 1 but one are high reflectivity (HR; typically greater than 95%, preferably greater than 99% peak reflectivity). Grating 15 (1480 nm) serves as output coupler, facilitating emission of 1480 nm output radiation from the 1480 nm optical cavity. Exemplarily, grating 15 has reflectivity in the range 4–15% at 1480 nm.

Conventionally, fiber Bragg gratings have bilateral symmetry. That is to say, the device has the same response spectrum for light traveling in one direction in the fiber as for light traveling in the opposite direction. Thus, with regard to FIG. 1, if pump reflector 16 has high reflectivity for 1117 nm radiation propagating downstream then the pump reflector also has high reflectivity for 1117 nm radiation that propagates upstream, and pumping of the structure with 1117 nm radiation from both sides would not be effective.

Figure 4:
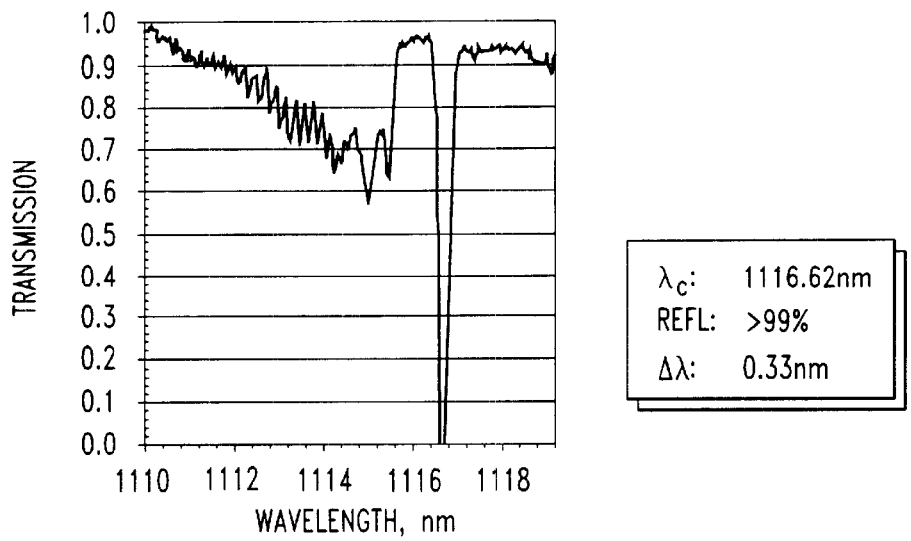
FIG. 4 shows the transmission of an exemplary fiber grating as a function of wavelength.

However, fiber Bragg gratings can be fabricated to have high reflectivity at a first wavelength (e.g., 1117 nm) and to have low reflectivity (e.g., transmission more than about 98%) at a nearby second wavelength (e.g., 1115 nm). FIG. 4 shows the spectrum of an exemplary fiber Bragg grating that can be used to practice the invention. The grating of FIG. 4 has center wavelength $\lambda_c$=1116.62 nm, with width of the reflectivity peak $\Delta\lambda$=0.33 nm, and maximum reflectivity greater than 99%.

FIG. 4 also shows that the grating has high transmission (and therefore has low reflection) in a spectral region on the low wavelength side of the reflectivity peak.

It will be understood that a transmission spectrum of the type depicted in FIG. 4 can be readily attained by conventional means, and does not require unconventional manufacturing.

Figure 3:
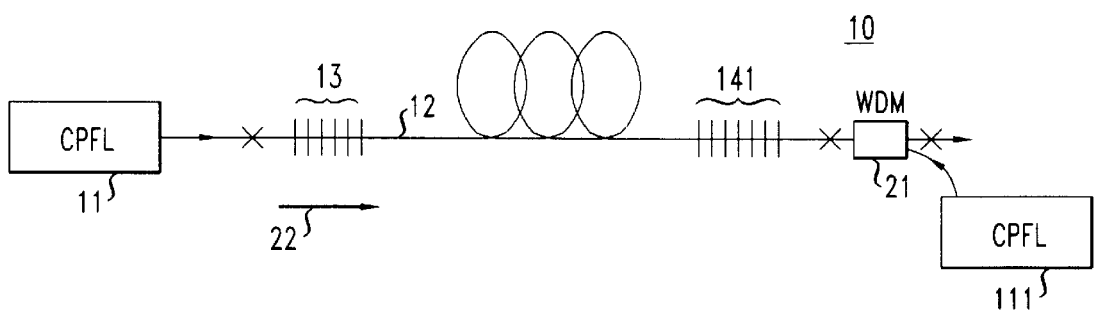
FIG. 3 schematically shows an exemplary, topologically linear Raman laser according to the invention.

FIG. 3 schematically shows an exemplary laser according to the invention. The laser of FIG. 3 resembles the prior art laser of FIG. 1 but exhibits significant differences. In particular, the laser of FIG. 3 comprises an additional CPFL 111, the output of the CPFL being coupled into the Raman fiber 12 by means of WDM 21. Whereas the output of CPFL 11 (wavelength 1117 nm) is on resonance with the pump reflector (1117 nm), the output of CPFL 111 (wavelength 1115 nm) is off resonance with respect to that reflector. The off resonance pump radiation is coupled into the Raman fiber 12, and propagates in the upstream direction substantially without interaction with gratings 141 and 13. Propagation of the 1115 nm pump radiation through Raman fiber 12 to the set of gratings 13 results in Stokes shifting of the 1115 nm pump radiation, with the Stokes shifted radiation propagating in the downstream direction.

The Raman spectrum of silica being relatively broad (see FIG. 2), the 1175 nm light generated by the 1175 nm cavity is almost as effective for stimulating the Stokes shift of the 1115 nm pump radiation as it is for the Stokes shift of the 1117 nm pump radiation. This is considered to be a significant feature of apparatus according to the invention.

The set of gratings 13 of FIG. 3 optionally comprises a pump reflector grating (not shown) with center wavelength 1115 nm, that reflects the unshifted 1115 nm pump radiation.

Figure 5:
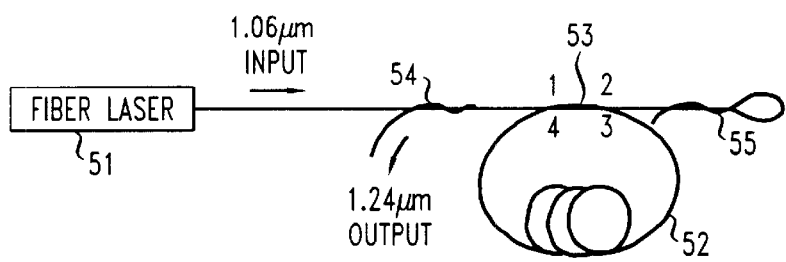
FIG. 5 schematically depicts a topologically circular prior art Raman laser.

A further prior art Raman laser (of circular topology) is described by S. V. Chernikov et al., op. cit. The disclosed laser exemplarily has 1.06 μm pump input and 1.24 μm output, with a first Stokes shift to 1.12 μm and a second Stokes shift to 1.18 μm. FIG. 5 corresponds to FIG. 1 of the reference. In FIG. 5, Yb-doped fiber laser 51 provides 1.06 μm input to the Raman laser. The ring cavity of the Raman laser comprises a WDM coupler 53 having ports 1–4, Ge-doped single mode silica fiber (1.2 km) 52, high reflector 55, and input/output WDM coupler 54.

The pump radiation is coupled into the Raman laser through WDM coupler 54 with center wavelengths at 1.06 and 1.24 μm. Since the Raman frequency shift in the fiber is about 440 cm$^{-1}$, conversion from 1.06 to 1.24 μm occurs through cascaded Raman scattering up to third order via two intermediate Stokes orders centered at 1.12 and 1.18 μm. The laser cavity therefore allows coupling of the pump power into the active Raman fiber and resonates in the first and second Stokes orders, leading to high intercavity intensities and minimized losses. The fused tapered coupler 53 is designed to transmit about 80% of the pump inside the loop at 1.06 μm from port 1 to 3. The remaining 20%, along with any unconverted pump power emerging from the loop, is reflected by the mirror 55 and partially coupled into the Raman fiber in the counter-propagating direction. The majority of pump energy entering the cavity is converted into the first Raman Stokes order. Since coupler 53 has a maximum transmission inside the loop from port 4 to port 3 for light at 1.12 and 1.18 μm, respectively, 85 and 95% of the light at those wavelengths will remain in the loop.

To suppress lasing at higher order Stokes (around 1.3 μm) a fiber-bend-type filter (not a shown) is formed inside the cavity. The Raman laser output is finally coupled out of the cavity through WDM 54.

Figure 6:
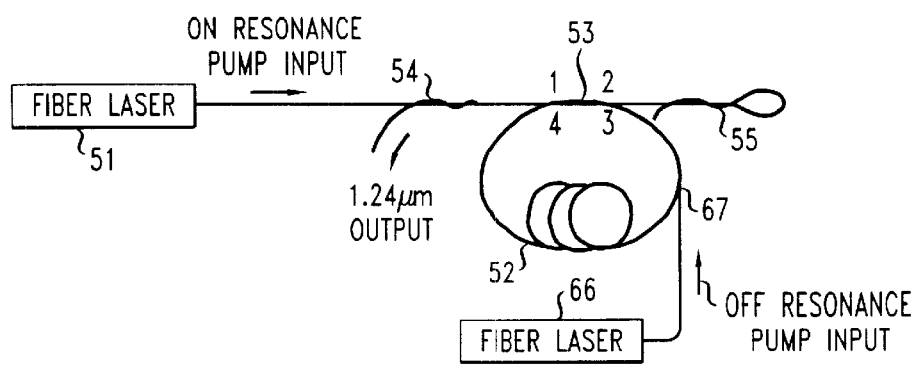
FIG. 6 schematically shows a topologically circular further Raman laser according to the invention.

FIG. 6 schematically depicts an exemplary Raman laser according to the invention that resembles the above described (topologically circular) prior art laser of FIG. 5. In addition to the features of the prior art Raman laser of FIG. 5, the laser according to the invention comprises a further pump source 66 having an output of wavelength different from that of source 51 (e.g., 1050 nm), and fused fiber coupler 67 is selected to facilitate coupling of the 1050 nm (off-resonance with respect to coupler 53, so that 85–95% couplers from port 3 to port 4) pump radiation into Raman fiber 52.

In the above described article according to the invention fused fiber couplers are the wavelength selective elements.

A (topologically linear) Raman amplifier resembles a (topologically linear) Raman laser, with pump radiation being Raman shifted through one or more stages, such that the resulting pump radiation has a wavelength that is one Stokes shift below a predetermined signal radiation. During operation of the Raman amplifier, the pump radiation is coupled into a silica-based optical fiber that carries the signal light, the signal radiation stimulating the energy transfer from the pump radiation to the signal radiation.

A (topologically circular) Raman amplifier according to the invention is structured substantially as shown in FIG. 6, with the output radiation during operation of the amplifier coupled into an optical fiber that carries the signal radiation.

Figure 7:
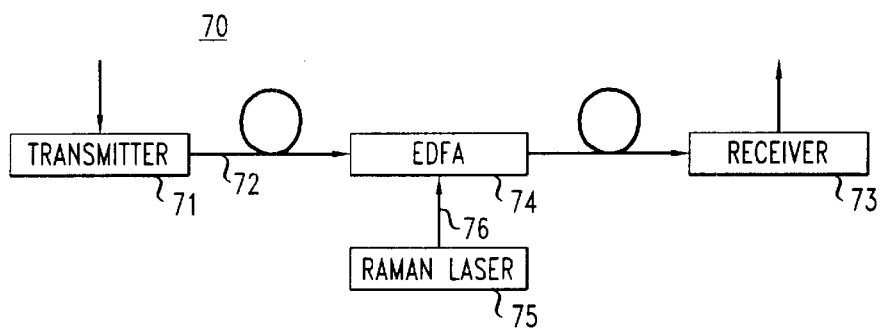
FIG. 7 schematically shows an exemplary optical fiber communication system according to the invention.
Figure 8:
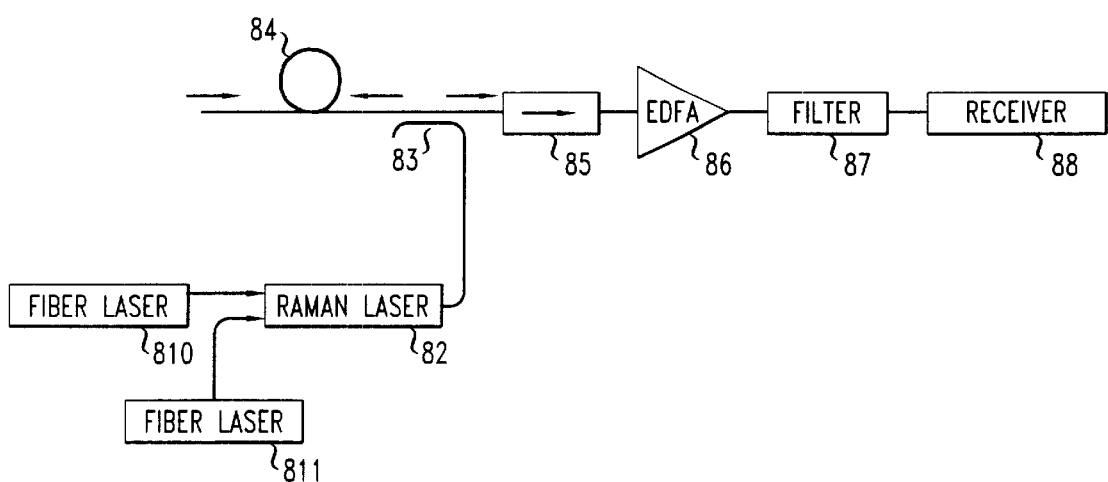
FIG. 8 schematically depicts an exemplary Raman amplifier with associated components.

FIG. 7 schematically shows an exemplary optical fiber communication system 70 according to the invention, wherein numerals 71–76 respectively refer to a transmitter, optical transmission fiber, receiver, EDFA, Raman laser according to this invention, and Raman laser output radiation, e.g., 1480 nm radiation FIG. 8 schematically depicts an exemplary Raman amplifier with associated components. Fiber laser 810, typically a Yb$^{+3}$ cladding pumped fiber laser, provides 1117 nm pump light to Raman laser 82, and fiber laser 811 provides 1115 pump light. The Raman laser is selected to have output light of wavelength 1453 nm. The 1453 nm pump light is coupled into the signal transmission path by conventional WDM 83 and propagates upstream through a length (e.g., about 20 km) of geimanosilicate fiber, through which one or more signals (wavelengths about 1.55 μm) propagate in the downstream direction. The signals are being amplified in conventional manner by stimulated Raman scattering. The amplified signal(s) propagates through a conventional optical isolator 85, a conventional EDFA 86, and a conventional band pass filter 87 to conventional receiver 88.

We claim:

1. An article comprising a fiber Raman device comprising:
   a) a length of silica-bases optical fiber comprising first and second wavelength-selective elements in the fiber to provide an optical cavity;
   b) a first coupler for coupling pump radiation of a first wavelength $\lambda_1$ from a first pump radiation source into said optical fiber; and
   c) means for providing a Raman device output radiation of wavelength $\lambda_0$ to output radiation utilization means, where $\lambda_0 > \lambda_1$;
   CHARACTERIZED IN THAT the Raman device further comprises
   d) a second coupler for coupling pump radiation of a second wavelength $\lambda_2$ from a second pump radiation source into said optical fiber, where $\lambda_2$ is different from $\lambda_1$, with $\lambda_0 > \lambda_2$, and wherein at least one of said wavelength-selective elements if off resonance with regard to at least one of $\lambda_1$ and $\lambda_2$.

2. Article according to claim 1, wherein said fiber Raman device is a fiber Raman laser.

3. Article according to claim 1, wherein said fiber Raman device is a fiber Raman amplifier.

4. Article according to claim 1, wherein one of said wavelength-selective elements is on resonance.

5. Article according to claim 1, wherein both of said wavelength-selective elements are off resonance.

6. Article according to claim 1, where said fiber Raman device is a topologically linear fiber Raman device, wherein $|\lambda_1 - \lambda_2|$ is greater than 0.2 nm.

7. Article according to claim 1, wherein said wavelength-selective elements comprise optical fiber Bragg gratings.

8. Article according to claim 1, wherein said wavelength-selective elements comprise fiber couplers.

9. Article according to claim 1, where said Raman device is a topologically circular fiber Raman device, wherein $|\lambda_1 - \lambda_2|$ is greater than 3 nm.

* * * * *